(12) United States Patent  
Chazot et al.

(10) Patent No.: US 11,470,472 B2  
(45) Date of Patent: Oct. 11, 2022

(54) SECURE WIRELESS COMMUNICATION WITH PERIPHERAL DEVICE

(71) Applicant: Logitech Europe S.A., Lausanne (CH)

(72) Inventors: Philippe Chazot, Saint Jorioz (FR); Marc Viredaz, Villaraboud (CH); Jiri Holzbecher, Lausanne (CH)

(73) Assignee: Logitech Europe S.A., Lausanne (CH)

( * ) Notice: Subject to any disclaimer, the term of this patent is extended or adjusted under 35 U.S.C. 154(b) by 499 days.

(21) Appl. No.: 16/428,759

(22) Filed: May 31, 2019

(65) Prior Publication Data

US 2020/0382954 A1 Dec. 3, 2020

(51) Int. Cl.
| | |
|---|---|
| *H04W 12/037* | (2021.01) |
| *H04L 9/08* | (2006.01) |
| *H04L 9/30* | (2006.01) |
| *H04L 9/14* | (2006.01) |
| *H04W 12/041* | (2021.01) |

(52) U.S. Cl.
CPC ............ *H04W 12/037* (2021.01); *H04L 9/085* (2013.01); *H04L 9/0819* (2013.01); *H04L 9/0869* (2013.01); *H04L 9/14* (2013.01); *H04L 9/30* (2013.01); *H04W 12/041* (2021.01)

(58) Field of Classification Search
CPC .................................................. H04W 12/037
See application file for complete search history.

(56) References Cited

U.S. PATENT DOCUMENTS

| | | | | |
|---|---|---|---|---|
| 2014/0104441 | A1* | 4/2014 | Rime ............... | H04N 21/44008 348/207.1 |
| 2015/0134956 | A1* | 5/2015 | Stachura ............. | H04L 63/0807 713/168 |
| 2017/0201500 | A1* | 7/2017 | Tormasov ............. | H04W 12/03 |
| 2018/0062863 | A1* | 3/2018 | Baskaran ............. | H04L 63/067 |
| 2020/0067711 | A1* | 2/2020 | Abadir .................. | H04L 63/126 |

\* cited by examiner

*Primary Examiner* — Simon P Kanaan
(74) *Attorney, Agent, or Firm* — Kilpatrick Townsend & Stockton LLP

(57) ABSTRACT

Methods and systems for performing wireless communication are presented. In one example, a wireless peripheral device comprises a wireless transceiver configured to receive and transmit data over a primary channel, an optical sensor configured to receive data over an out-of-band channel, and one or more processors configured to: receive, via the wireless transceiver and over the primary channel, wireless signals including first key data from a second device; receive, via the optical sensor, optical signals including verification data from the second device; verify the first key data based on the verification data; and responsive to verifying the first key data based on the verification data, generate a digital security key based on the first key data, the digital security key used for following data transmission between the wireless peripheral device and the second device via the wireless transceiver.

6 Claims, 12 Drawing Sheets

SECURE WIRELESS COMMUNICATION WITH PERIPHERAL DEVICE

BACKGROUND

Peripheral devices can be used to interface between human and computer. Some common peripheral devices include keyboards, computer mice, image scanners, speakers, microphones, web cameras, and more. These peripheral devices can be connected with computers via wireless connections (e.g., BlueTooth®) to transmit input data to the computer, to receive output data from the computer, etc. By providing wireless connections between the peripheral devices and the computers, the utility of the peripheral devices can be further improved. For example, the wireless connection can replace a wired connection that would otherwise hinder the movement of a wireless mouse or restrict the location of a wireless keyboard. The wireless mouse can become more nimble and easy to move. A user can also place the wireless keyboard at anywhere that suits the user. User experience can be improved as a result.

To improve security, a pairing process can be performed, over the wireless communication channel, between a wireless peripheral device and a host computer to enable the wireless peripheral device and the host computer to recognize each other. The pairing process also enable the wireless peripheral device and the host computer to reject wireless data from other unknown devices. As part of the pairing process, the wireless peripheral device and the host computer can exchange security information to generate a shared secret key. The wireless peripheral device and the host computer can then authenticate each other based on the shared secret key, and/or use the shared secret key to encrypt data exchanged between the wireless peripheral device and the host computer to complete the pairing process. Upon completion of the pairing process, the wireless peripheral device and the host computer can exchange operation data including, for example, input data from the wireless peripheral device to control an operation of the host computer.

Although the pairing process can improve security, it can be susceptible to a man-in-the-middle (MITM) attack. As described above, as part of the pairing process, the wireless mouse and the host computer can exchange security information to generate a shared secret key. The attacker device can interpose between the wireless peripheral device and the host computer and intercept and modify the security information. By modifying the security information received by the wireless peripheral device and the host computer, the attacker device can create a shared secret with each of the wireless peripheral device and the host computer individually, and pair with each device individually. Each of the host computer and the wireless peripheral device may be unaware it is communicating and pairing with the attacker device. The MITM attack allows the attacker device to, for example, control the host computer on behalf of the wireless peripheral device, intercept input data provided from the wireless peripheral device to the host computer, etc., all of which can pose grave security risk to the host peripheral device and to the user.

BRIEF SUMMARY

In some examples, wireless peripheral device comprises: a wireless transceiver configured to receive and transmit data over a primary channel; an optical sensor configured to receive data over an out-of-band channel; one or more non-transitory computer readable storage mediums that stores a set of instructions; and one or more processors that, upon execution of the set of instructions, is configured to: receive, via the wireless transceiver and over the primary channel, wireless signals including first key data from a second device; receive, via the optical sensor, optical signals including verification data from the second device; verify the first key data based on the verification data; and responsive to verifying the first key data based on the verification data, generate a digital security key based on the first key data, the digital security key used for following data transmission between the wireless peripheral device and the second device via the wireless transceiver.

In some aspects, the verification data comprises a reference and a code. Verifying the first key data based on the verification data comprises: combining the first key data with the code to generate an output; and verifying the first key data based on comparing the output with the reference.

In some aspects, the code comprises a random number generated by the second device.

In some aspects, the digital security key is a secret key shared between the wireless peripheral device and the second device. The one or more processors is configured to execute the set of instructions to: encrypt second data based on the secret key; and transmit the encrypted second data over the primary channel to the second device.

In some aspects, the wireless peripheral device further comprises an optical transmitter. The verification data is first verification data. The one or more processors are configured to execute the set of instructions to: transmit, via the optical transmitter and over the out-of-band channel, second verification data to the second device; and transmit, via the wireless transceiver and over the primary channel, second key data to the second device. The transmission of the second verification data and the second key data enables the second device to verify the second key data and to, responsive to verifying the second key data, generate the secret key based on the second key data.

In some aspects, the first key data comprises a public key of the second device. The one or more processors are configured to execute the set of instructions to generate the secret key based on the public key of the second device and a private key of the wireless peripheral device.

In some aspects, the one or more processors is configured to: responsive to verifying the first key data, process additional data received from the second device over the primary channel using the digital security key.

In some aspects, the one or more processors is configured to: receive, via the wireless transceiver from a third device, third key data from a third device; verify the third key data based on the verification data; and responsive to determining that the third key data cannot be verified with the verification data, reject additional data from the third device received over the primary channel.

In some aspects, the optical sensor is configured to receive the verification data from a light emitting device of the second device over the out-of-band channel.

In some aspects, the one or more processors is configured to: receive, via the optical sensor from the light emitting device, a time-series pattern of output light intensities; and convert the pattern to the verification data.

In some aspects, the light emitting device is at least one of: a part of a display of the second device, a part of a keyboard of the second device, a part of a charging pad of the wireless peripheral device, or a charging station of the wireless peripheral device.

In some aspects, the wireless peripheral device further comprises a light emitting device configured to transmit light onto a surface to enable the optical sensor to receive the light reflected from the surface. The one or more processors is configured to execute the set of instructions to disable the light emitting device when the optical sensor receives the verification data from the second device via the out-of-band channel.

In some examples, an apparatus comprises: a display; a wireless transceiver configured to receive and transmit data over a primary channel; one or more non-transitory computer readable storage mediums that stores a set of instructions; and one or more processors that, upon execution of the set of instructions, is configured to: generate a plurality of image frames, each of the plurality of image frames containing one or more pixels representing a different part of verification data; output, via the display, the plurality of image frames sequentially to transmit the verification data to a wireless peripheral device over an out-of-band channel; and transmit, via the wireless transceiver over the primary channel, first key data to the wireless peripheral device. The transmission of the verification data and the first key data to the wireless peripheral device enable the wireless peripheral device to: verify the first key data based on the verification data; and responsive to verifying the first key data based on the verification data, generate a digital security key based on the first key data.

In some aspects, the one or more processors is configured to generate the each image frame to set a pre-determined pixel region of the each image frame to have the one or more pixels. The one or more processors is configured to set a size of the pixel region to be smaller than a footprint of the wireless peripheral device.

In some aspects, the size of the pixel region is configured such that the wireless peripheral device is capable of receiving the verification data when an optical sensor of the wireless peripheral device aligns with the pixel region. The wireless peripheral device completely covers the pixel region when the optical sensor of the wireless peripheral device is positioned within the pre-determined distance over the display.

In some aspects, the one or more processors is configured to: receive an indication to initiate transmission of the verification data; and output the plurality of image frames via the display in response to receiving the indication.

In some aspects, the one or more processors is configured to control the display to output a prompt for bringing the wireless peripheral device onto the display prior to outputting the plurality of image frames.

In some aspects, the one or more processors is configured to: generate the digital security key; encrypt second data based on the digital security key; and transmit the encrypted second data over the primary channel to the wireless peripheral device.

In some examples, a method of performing wireless communication comprises: receiving, by a wireless peripheral device and via a wireless transceiver and over a primary channel, wireless signals including first key data from a host computer; receiving, by the wireless peripheral device and via an optical sensor, optical signals including verification data from the host computer; verifying, by the wireless peripheral device, the first key data based on the verification data; and responsive to verifying the first key data based on the verification data, generating, by the wireless peripheral device, a digital security key based on the first key data, the digital security key used for following data transmission between the wireless peripheral device and the host computer via the wireless transceiver.

In some aspects, a method comprises: generating, by a host computer, a plurality of image frames, each of the plurality of image frames containing one or more pixels representing a different part of verification data; outputting, via a display of the host computer, the plurality of image frames sequentially to transmit the verification data to a wireless peripheral device over an out-of-band channel; and transmitting, via a wireless transceiver of the host computer over a primary channel, first key data to the wireless peripheral device. The transmitting of the verification data and the first key data to the wireless peripheral device enable the wireless peripheral device to: verify the first key data based on the verification data; and responsive to verifying the first key data based on the verification data, generate a digital security key based on the first key data.

BRIEF DESCRIPTION OF THE DRAWINGS

The detailed description is set forth with reference to the accompanying figures.

DETAILED DESCRIPTION

Figure 1:
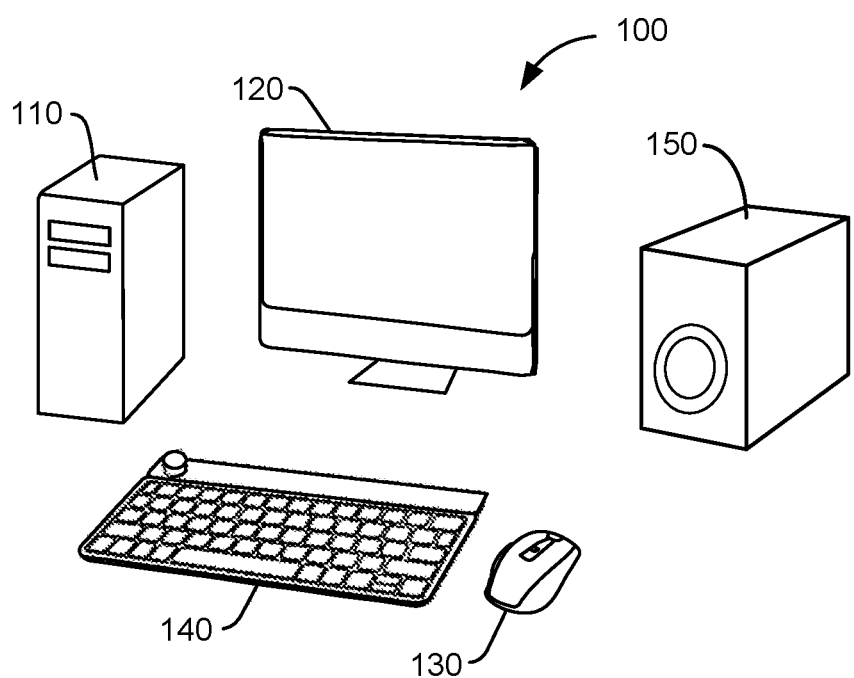
FIG. 1 shows a typical implementation for a system utilizing the disclosed techniques.

Aspects of the present disclosure relate generally to peripheral devices, and in particular to secure communication between a host computer and a wireless peripheral device (such as a wireless mouse), according to certain examples.

In the following description, various examples of secure wireless communication between a wireless peripheral device and a host computer will be described. For purposes of explanation, specific configurations and details are set forth in order to provide a thorough understanding of the embodiments. However, it will be apparent to one skilled in the art that certain embodiments may be practiced or implemented without every detail disclosed.

Furthermore, well-known features may be omitted or simplified in order to prevent any obfuscation of the novel features described herein.

Despite the improvement brought about by wireless technology, various security threats may exist in the wireless transfer of data between a wireless peripheral device (e.g., a wireless mouse, a wireless keyboard, etc.) and a host computer. For example, a wireless pairing process between the wireless peripheral device and the host computer, meant to enable the two parties to exchange security data to generate shared secret to authenticate each other, can be susceptible to a man-in-the-middle (MITM) attack.

As an illustrative example, at the beginning of pairing process, a wireless peripheral device can transmit first security data to the host computer. The host computer can generate second security data and generate a digital security key based on the first security data and the second security data. The host computer can transmit the second security data back to the wireless peripheral device. The wireless peripheral device can also generate the digital security key based on the second security data received from the host computer, as well as the first security data. As a result of the exchange of the first security data and the second security data, a shared digital security key can be generated and stored at each of the host computer and the wireless peripheral device. At a later stage of the pairing process, each of the wireless peripheral device and the host computer can authenticate each other based on whether each device possesses the shared secret.

The pairing process described above can be susceptible to a MITM attack by an attacker device interposing between the wireless peripheral device and the host computer. The attacker device can intercept the first security information from the wireless peripheral device and the second security information from the host computer. The attacker device can combine the first security information with fake second security information to generate a first key, and send the fake second security information to the wireless peripheral device to share the first key. The attacker device can also combine the second security information (received from the host computer) with fake first security information to generate a second key, and send the fake first security information to the wireless peripheral device so that both devices share the second key. Each of the wireless peripheral device and the host computer can authenticate the attacker device based on, respectively, the first shared key and the second shared key and pair with the attacker device. As the direct communication between the wireless peripheral device and the host computer has been severed, neither is aware of pairing and communicating with an attacker device.

The MITM attack pose grave security risk to both the host computer and the user. Specifically, as the attacker device interposes between the wireless peripheral device and the host computer, the attacker device can intercept and/or modify data transmitted by each of the wireless peripheral device and the host computer. For example, the attacker can control the host computer on behalf of the wireless mouse, intercept input data (e.g. keystrokes) transmitted from the wireless keyboard to the host computer which may include sensitive information, etc.

One way to mitigate MITM attack is by performing an authentication process. For example, a wireless peripheral device can accept wireless data from a sender device only after authenticating the sender device as a trusted device. To allow the wireless peripheral device to authenticate the host computer, a trusted party (e.g., the user) can input host security information provided by the host computer into the wireless peripheral device, which can then use the host security information to authenticate the sender of subsequent wireless data as the host computer. The wireless peripheral device may also provide peripheral device security information to the user. The user can input the peripheral device security information to the host computer, which can then use the peripheral device security information to authenticate the sender of subsequent wireless data as the wireless peripheral device. Such arrangements, however, is unsuitable for wireless peripheral devices that lack input capabilities to support manual input of security information and/or output capabilities to display security information, such as computer mouse. New developments are needed to improve the wireless pairing process to make it more resistant to MITM attack, such that the security risk posed by MITM attack can be eliminated or at least reduced.

Conceptual Overview of Certain Embodiments

Examples of the present disclosure relate to a wireless peripheral device, such as a wireless mouse, that addresses at least some of the issues described above. The wireless peripheral device includes a wireless transceiver and an optical sensor. The wireless transceiver can communicate with a second device, such as a host computer, over a primary channel via the wireless transceiver, and receive data from the second device over an optical out-of-band channel via the optical sensor. As used herein, a "primary channel" may refer to a primary communication channel between the wireless peripheral device and the second device. Majority of the communication between the wireless peripheral device and the second device, such as exchange of security data for a pairing process, transmission of input data from the wireless peripheral device to the second device to control a function of the second device, etc., can take place over the primary channel. The out-of-band channel can be used to transfer data that are not transferred over the primary channel. The primary channel and the out-of-band channel can be formed with different physical media and/or different communication protocols. For example, the primary channel can be formed based on radio signals, whereas the out-of-band channel can be formed based on optical signals. In some examples, the wireless peripheral device can be a computer mouse.

The wireless peripheral device can perform a pairing process with the second device in order to transmit input data to control a function of the second device. Prior to or at the beginning of the pairing process, the wireless peripheral device can receive, via the wireless transceiver and over the primary channel, first key data from the second device. The first key data can be used to generate a shared secret key for a subsequent authentication and/or data encryption operation with the second device. The wireless peripheral device can also receive, via the optical sensor and over the out-of-band channel, verification data from the second device. The wireless peripheral device can verify the first key data based on the verification data to authenticate the second device. Responsive to authenticating the second device based on the verification data, the wireless peripheral device can generate the key based on the first key data, and complete the pairing process with the second device using the key. In some examples, the peripheral device can also include an optical transmitter (e.g., a light emitting diode (LED)) to transmit second verification data to the second device over the optical out-of-band channel, and can transmit second key data to the second device over the primary channel. The transmission of the second verification data and the second key data enables the second device to verify the second key data and to, responsive to verifying the second key data, generate the key based on the second key data. Through exchange of verification data and key data over the optical out-of-band channel, the wireless peripheral device and the second device can authenticate each other and that the devices are communicating directly with each other. Such arrangements also obviate the need for manual entry of verification data into the wireless peripheral device. After both devices generate the shared secret key based on the exchanged key data, both devices can use the shared secret key for subsequent communication.

In some examples, the verification data can include a reference and a code. The code can be a random number, whereas the reference can be generated by a combination of the code and the first key data. Upon receiving the verification data, the peripheral device can extract the reference and the code from the verification data, combine the code with the first key data to generate an output, and compare the output with the reference. If the reference matches the output, the peripheral device can determine that the first key data is verified. In some examples, the first key data can include a first public key of the second device, whereas the second key data can include a second public key of the wireless peripheral device. The wireless peripheral device can generate the shared secret key based on a first private key of the wireless peripheral device and the first public key of the second device, whereas the second device can generate the shared secret key based on a second private key of the second device and the second public key of the wireless peripheral device, upon the verification of the first public key and the second public key.

Various techniques are proposed for the transmission of the verification data of the optical out-of-band channel. In some examples, a display of the second device can output a sequence of image frames, with each image frame containing pixel data representing a part of the verification data. The pixel data can represent the verification data based on a modulated intensity, a pixel color, or a combination of both. The wireless peripheral device can detect the sequence of image frames to obtain a time-series optical pattern and extract the verification data from the optical pattern. In some examples, the second device can include an optical transmitter, such as one or more light emitting diodes (LEDs), to transmit a sequence of optical signals representing the verification data. Light of different wavelengths can be used to transmit the verification data, including visible light, infra-red light, etc.

Various techniques are proposed to improve the security of the optical out-of-band channel to prevent interception of the verification data by a MITM attack. For example, the optical out-of-band channel can be established when the wireless peripheral device is positioned over a display of the second device that outputs image frames containing the pixel regions of verification data, and the pixel regions are made smaller than the footprint of the computer mouse so that the pixel regions are covered by the computer mouse when receiving the verification data. As another example, the second device may include a proximity sensor and will transmit optical signals including the verification data only when the proximity sensor detects that the wireless peripheral device is within a pre-determined distance from the display or from the optical transmitter of the second device. In addition, the output intensities of the display/optical transmitter can also be reduced to prevent another device from receiving the optical signals of the verification data from afar. All these techniques can reduce the likelihood of a MITM attacker from eavesdropping on the optical signals containing the verification data.

Typical System Environment for Certain Embodiments

FIG. 1 shows a typical implementation for a system 100 that can utilize the disclosed techniques. System 100 may include computer 110, display 120, and a plurality of peripheral devices including, for example, peripheral device 130 (e.g., "computer mouse 130"), peripheral device 140 (e.g., "keyboard 140"), and peripheral device 150 (e.g., "microphone 150"). For system 100, computer mouse 130, keyboard 140, and microphone 150 can be configured to control aspects of computer 110 and display 120, as would be understood by one of ordinary skill in the art. Computer 110 can be referred to as a "host computer" or a "host computing device." Each of peripheral devices 130-150 can include one or more sensors to sense an input action (or input signals, such as audio signals) provided by a user and generate corresponding sensor data (e.g., sensor data representing a distance of movement of computer mouse 130, sensor data indicating pressing of a key of keyboard 140, audio data collected by microphone 150, etc.). Peripheral devices 130-150 can provide the sensor data to computer 110 to control one or more operations of computer 110. For example, based on a movement detected by computer mouse 130, computer 110 can detect a selection of an audio file by the user in a graphical user interface displayed on display 120 and play the selected audio file.

Computer 110 may include a machine readable medium (not shown) that is configured to store computer code, such as keyboard driver software, and the like, where the computer code is executable by a processor (e.g., processor(s) 302) of computer 110 to affect control of computer 110 by peripheral devices 130, 140, and/or 150. The various examples described herein generally refer to peripheral device 130 as a computer mouse, peripheral device 140 as a keyboard, and peripheral device 150 as a microphone, however it should be understood that peripheral devices 130-150 can be any input/output (I/O) device, user interface device, control device, input unit, or the like. For example, peripheral devices 130-150 can also be a remote control device, a wearable device (e.g., smart watch, wristband, glasses), a smart phone, or the like.

The host computing device is typically described as a desktop or laptop computing device. However, it should be understood that the host computing device can be any suitable computing device further including a tablet computer, a smart phone, a virtual or augmented reality interface (e.g., having 2D or 3D displays), a holographic interface, or the like. One of ordinary skill in the art would understand the many variations, modifications, and alternative embodiments thereof.

Figure 2:
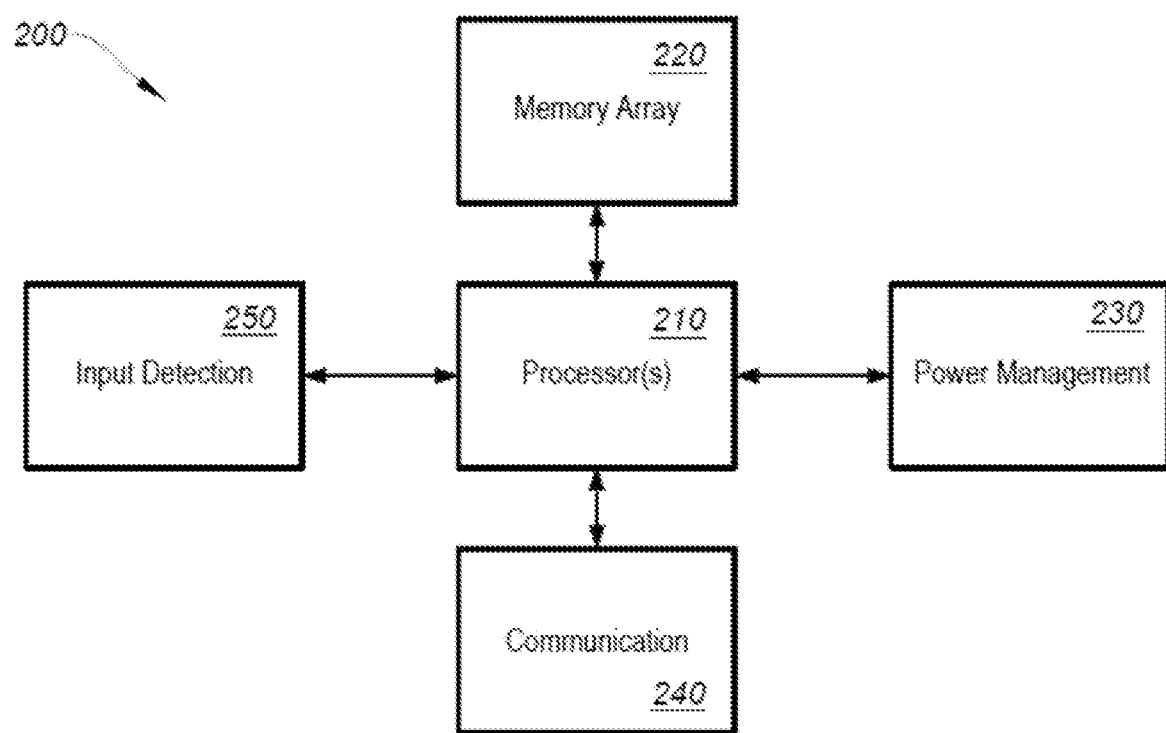
FIG. 2 shows a system for operating an peripheral device, according to certain embodiments of the present disclosure.

FIG. 2 shows a system for operating an peripheral device (e.g., one or more of peripheral devices 130-150), according to certain embodiments. System 200 includes processor(s) 210, memory array 220, power management system 230, communication system 240, and input detection module 250. Each of the system blocks 220-250 can be in electrical communication with the processor(s) 210 (e.g., via a bus system). System 200 may further include additional systems that are not shown or discussed to prevent obfuscation of the novel features described herein. System blocks 220-250 may be implemented as separate modules, or alternatively, more than one system block may be implemented in a single module.

In certain embodiments, processor(s) 210 comprises one or more microprocessors (μCs) and can be configured to control the operation of system 200. Alternatively, processor(s) 210 may include one or more microcontrollers (MCUs), digital signal processors (DSPs), or the like, with supporting hardware and/or firmware (e.g., memory, programmable I/Os, etc.), as would be appreciated by one of ordinary skill in the art. Processor(s) 210 can control some or all aspects of operation of peripheral devices 130-150 (e.g., system block 220-250). Alternatively or additionally, some of system blocks 220-250 may include an additional dedicated processor, which may work in conjunction with processor 210. One of ordinary skill in the art would understand the many variations, modifications, and alternative embodiments thereof.

Memory array 220 may be configured to store information pertaining to one or more operational configurations of peripheral devices 130-150. As further discussed below, one or more operational configurations of peripheral devices 130-150 may include setting performance characteristics of peripheral devices 130-150, including but not limited to, a computer mouse scroll speed, a sensitivity of computer mouse movement sensor, mapping of keyboard hot keys, microphone volume, etc., and the like. Memory array 220 may also store other configuration information used for communication with peripheral devices 130-150, as further discussed below.

Additionally, memory array 220 can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for processing by processing devices. Software can be implemented as a single program or a collection of separate programs and can be stored in non-volatile storage and copied in whole or in-part to volatile working memory during program execution.

Power management system 230 can be configured to manage power distribution, recharging, power efficiency, and the like, for peripheral devices 130-150. In some embodiments, power management system 230 can include a battery (not shown), a USB based recharging system for the battery (not shown), and power management devices (e.g., low-dropout voltage regulators—not shown). In certain embodiments, the functions provided by power management system 230 may be incorporated into processor(s) 210. The power source can be a replaceable battery, a rechargeable energy storage device (e.g., super capacitor, Lithium Polymer Battery, NiMH, NiCd), or a corded power supply. The recharging system can be an additional cable (specific for the recharging purpose) or it can use a USB connection to recharge the battery.

Communications system 240 can be configured to provide wireless and/or wired communication between processors 210 and one or more of peripheral devices 130-150, according to some examples. Communications system 240 can be configured to provide radio-frequency (RF), Bluetooth®, BLE, WiFi, infra-red (IR), ZigBee®, Logitech Unifying®, or other suitable communication technology to communicate with other computing devices and/or peripheral devices. Communications system 240 may also provide hardwired connection with processors 210. The hardwired connection can include a serial interconnect such as, for example, Universal Serial Bus (USB), FireWire®, DisplayPort®, etc.

One example of communication system 240 can be a dongle, which can provide a combination of wireless and wired communication between processors 210 and one or more of peripheral devices 130-150. For example, the dongle may include a wired connector interface (e.g., a USB connector) which can be plugged into a hardwire interface port (e.g., a USB port). The hardwire interface port, in turn, is connected to processors 210 via a hardwired interconnect (e.g., USB buses). Moreover, the dongle may also include a wireless interface (e.g., a Bluetooth® wireless interface) to perform wireless data transfer with peripheral devices 130-150. The dongle can receive sensor data from peripheral devices 130-150 via the wireless interface, and transmit the sensor data to processors 210 via the hardwired interconnect. As to be discussed in more details below, the present disclosure provide techniques to synchronize the wireless data transfer (via the wireless interface) with the wired data transfer (via the hardwired interconnect), which can reduce data transfer delay between peripheral devices 130-150 and processors 210.

Input detection module 250 can control the detection of a user-interaction with input elements on peripheral devices 130-150. For instance, input detection module 250 can detect user inputs based on sensor data from computer mouse 130. In some embodiments, input detection module 250 can work in conjunction with memory array 220 to generate input data to processors 210 based on the sensor data received from communication system 240. For example, based on scrolling speed information stored in memory array 220 as well as sensor data from computer mouse 130, input detection module 250 can calculate a distance traversed by a mouse pointer on display 120, and provide the distance information to processors 210 (or a renderer) to render the movement of the mouse on display 120.

Although certain systems may not expressly discussed, they should be considered as part of system 200, as would be understood by one of ordinary skill in the art. For example, system 200 may include a bus system to transfer power and/or data to and from the different systems therein.

It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices implemented using any combination of circuitry and software. Furthermore, aspects and/or portions of system 200 may be combined with or operated by other sub-systems as required by design. For example, input detection module 250 and/or memory array 220 may operate within processor(s) 210 instead of functioning as a separate entity. In addition, the inventive concepts described herein can also be applied to various peripheral devices and not limited to computer mice, keyboards, or microphones. System 200 can be applied to any of the peripheral devices described in the embodiments herein, whether explicitly, referentially, or tacitly described (e.g., would have been known to be applicable to a particular peripheral device by one of ordinary skill in the art). The foregoing embodiments are not intended to be limiting and those of ordinary skill in the art with the benefit of this disclosure would appreciate the myriad applications and possibilities.

Figure 3:
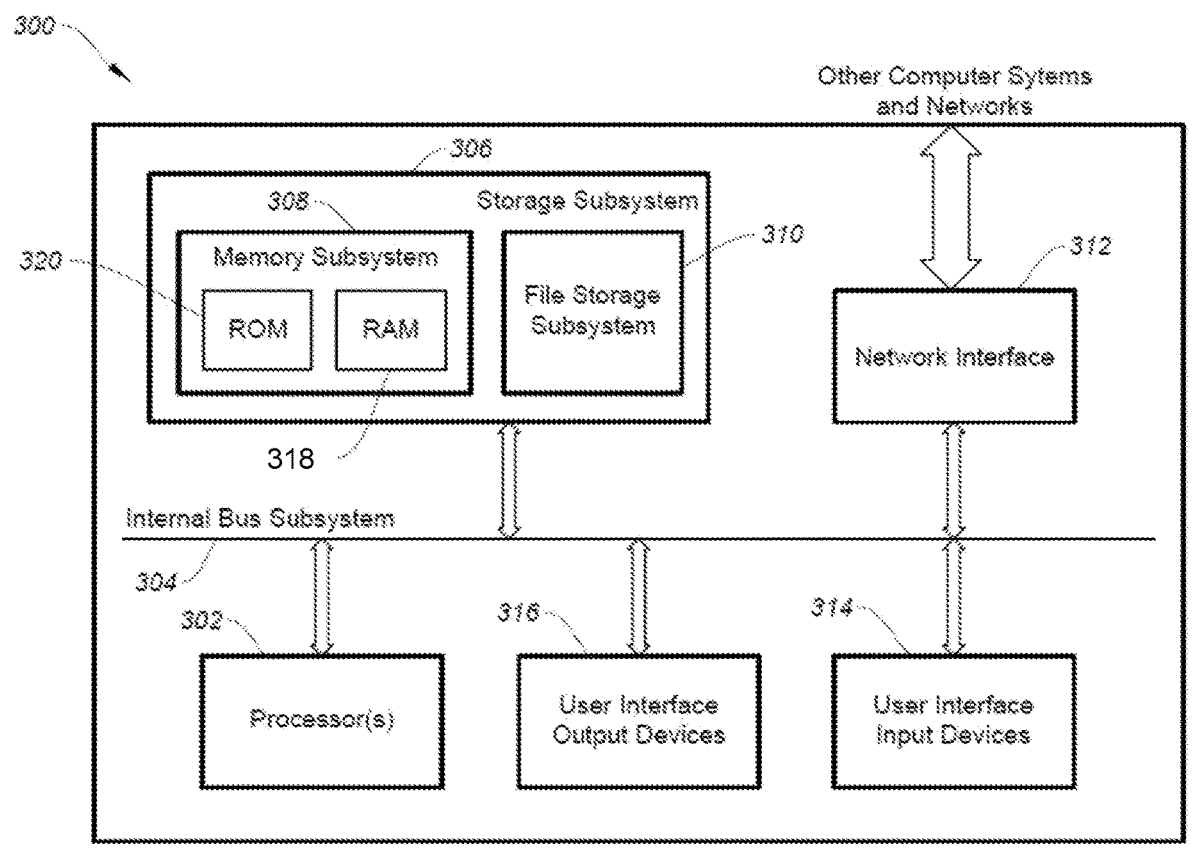
FIG. 3 shows a system for operating a host computing device, according to certain embodiments of the present disclosure.

FIG. 3 shows a system 300 for operating a host computing device (e.g., host computing device 110), according to certain embodiments. System 300 can be used to implement any of the host computing devices discussed herein with respect to FIG. 1, FIG. 2, and the myriad examples described herein or within the purview of this disclosure but not necessarily explicitly described. System 300 can include one or more processors 302 that can communicate with a number of peripheral devices (e.g., peripheral devices) via a bus subsystem 304. These peripheral devices can include storage subsystem 306 (comprising memory subsystem 308 and file storage subsystem 310), user interface input devices 314 (also referred to as a user peripheral device, peripheral device, and user input device), user interface output devices 316, and network interface 312. User interface input devices 314 can be any of the peripheral device types described herein (e.g., keyboard, computer mouse, remote control, etc.). User output devices 316 can be a display of any type, including computer monitors, displays on handheld devices (e.g., smart phones, gaming systems), or the like, as would be understood by one of ordinary skill in the art. Alternatively or additionally, a display may include virtual reality (VR) displays, augmented reality displays, holographic displays, and the like, as would be understood by one of ordinary skill in the art.

In some examples, internal bus subsystem 304 can provide a mechanism for letting the various components and subsystems of computer system 300 communicate with each other as intended. Although internal bus subsystem 304 is shown schematically as a single bus, alternative embodiments of the bus subsystem can utilize multiple buses. One example of internal bus subsystem 304 includes USB buses. Additionally, network interface 312 can serve as an interface for communicating data between computer system 300 and other computer systems or networks. Embodiments of network interface 312 can include wired interfaces (e.g., Ethernet, CAN, RS232, RS485, etc.) or wireless interfaces (e.g., Bluetooth®, BLE, ZigBee®, Z-Wire®, Wi-Fi, cellular protocols, etc.). In some examples, network interface 312 may be part of a dongle, and the dongle can be connected to internal bus subsystem 304 (e.g., USB buses) to communicate with processor(s) 302 as described above.

In some cases, user interface input devices 314 can include a keyboard (keyboard 140), a presenter, a pointing device (e.g., mouse, trackball, touchpad, etc.), a touchscreen incorporated into a display, audio peripheral devices (e.g., voice recognition systems, microphones, etc.), Human Machine Interfaces (HMI) and other types of peripheral devices. In general, use of the term "peripheral device" is intended to include all possible types of devices and mechanisms for inputting information into computer system 300. Additionally, user interface output devices 316 can include a display subsystem, a printer, or non-visual displays such as audio output devices, etc. The display subsystem can be any known type of display device. In general, use of the term "output device" is intended to include all possible types of devices and mechanisms for outputting information from computer system 300.

Storage subsystem 306 can include memory subsystem 308 and file storage subsystem 310. Memory subsystems 308 and file storage subsystem 310 represent non-transitory computer-readable storage media that can store program code and/or data that provide the functionality of embodiments of the present disclosure. In some embodiments, memory subsystem 308 can include a number of memories including main random access memory (RAM) 318 for storage of instructions and data during program execution and read-only memory (ROM) 320 in which fixed instructions may be stored. File storage subsystem 310 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 300 is illustrative and not intended to limit embodiments of the present disclosure. Many other configurations having more or fewer components than system 300 are possible. The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard or non-standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle Microsoft Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Examples of a Communication System

Figure 4:
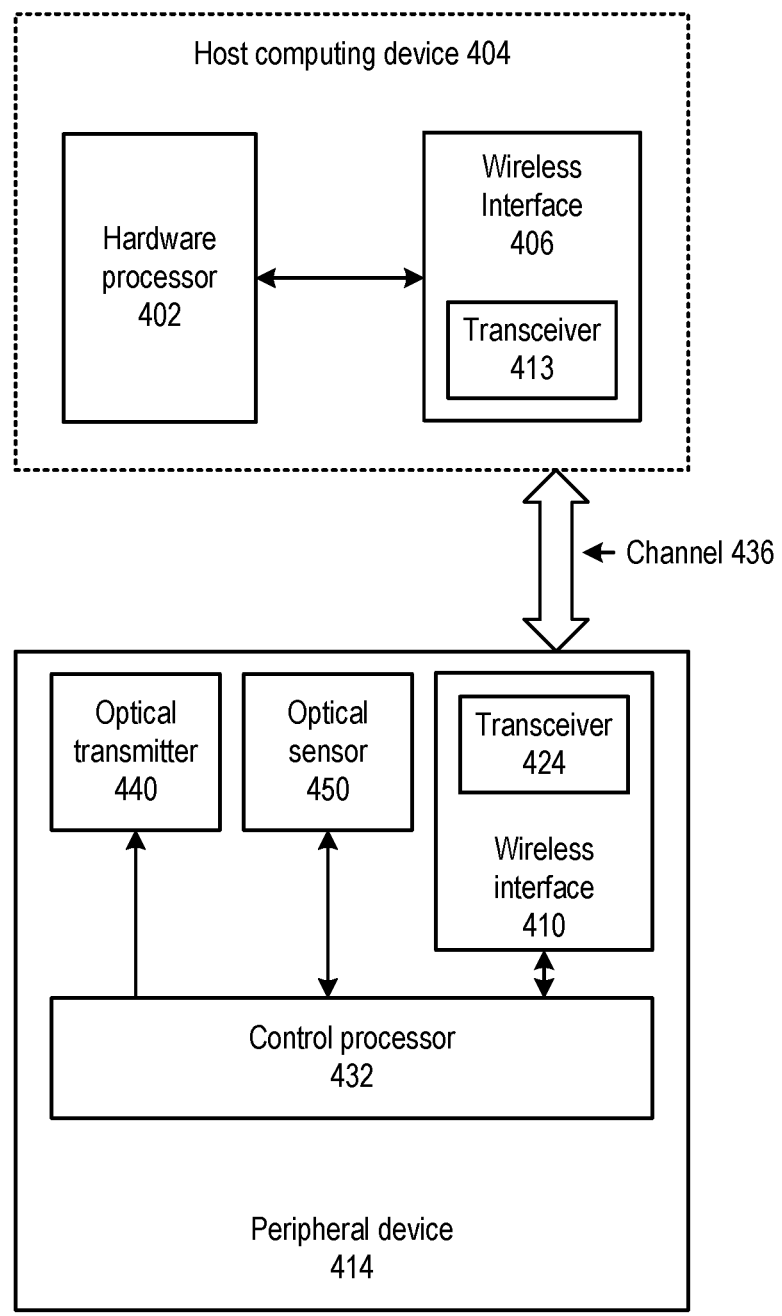
FIG. 4 shows an example communication system, according to certain embodiments of the present disclosure.

FIG. 4 shows an example of a communication system 400 for which the disclosed techniques can be applied. Communication system 400 can provide data transfer between a hardware processor 402 (e.g., processors 210 of FIG. 2, processors 302 of FIG. 3, etc.) of a host computing device 404 and a peripheral device 414 (e.g., peripheral devices 130-150). Communication system 400 may include a wireless interface 406 (e.g., as part of computer 110 and/or systems 200 and 300), and a wireless interface 410 on the side of peripheral device 414. Wireless interface 406 may include one or more wireless transceivers 413, whereas wireless interface 410 may also include a wireless transceiver 424. Each of wireless transceivers 413 and 424 can be controlled by, respectively, hardware processor 402 and control processor 432, to transmit and receive radio signals to perform wireless data transfer. Wireless transceivers 413 and 424 may include, for example, antennae, power amplifiers, low noise amplifiers, mixers, analog-to-digital converters (ADC), etc., and can perform data transfer based on pre-determined protocols including, for example, Bluetooth®, BLE, etc.

A radio communication channel 436 can be established over wireless interfaces 406 and 410 based on one or more of those protocols for transfer of data between hardware processor 402 and peripheral device 414. The data can include input data received by peripheral device 414 to control an operation of host computing device 404. For example, peripheral device 414 can be an optical computer mouse, and may include an optical transmitter 440 and an optical sensor 450. Optical transmitter 440 may include, for example, a light emitting diode (LED), a laser diode, etc. The optical computer mouse can transmit, using optical transmitter 440, light to a surface and collect reflected light from the surface using optical sensor 450. Based on the detection of reflected light, control processor 432 can determine the pixel values of the surface and determine the speed and direction of a movement of the optical mouse based on the pixel values. Control processor 432 can then transfer data indicating the speed and direction of the movement to hardware processor 402 via wireless interface 406. Hardware processor 402 can receive the data via wireless interface 406 and change the display location of a cursor based on the data.

An Example Pairing Process

Figure 5:
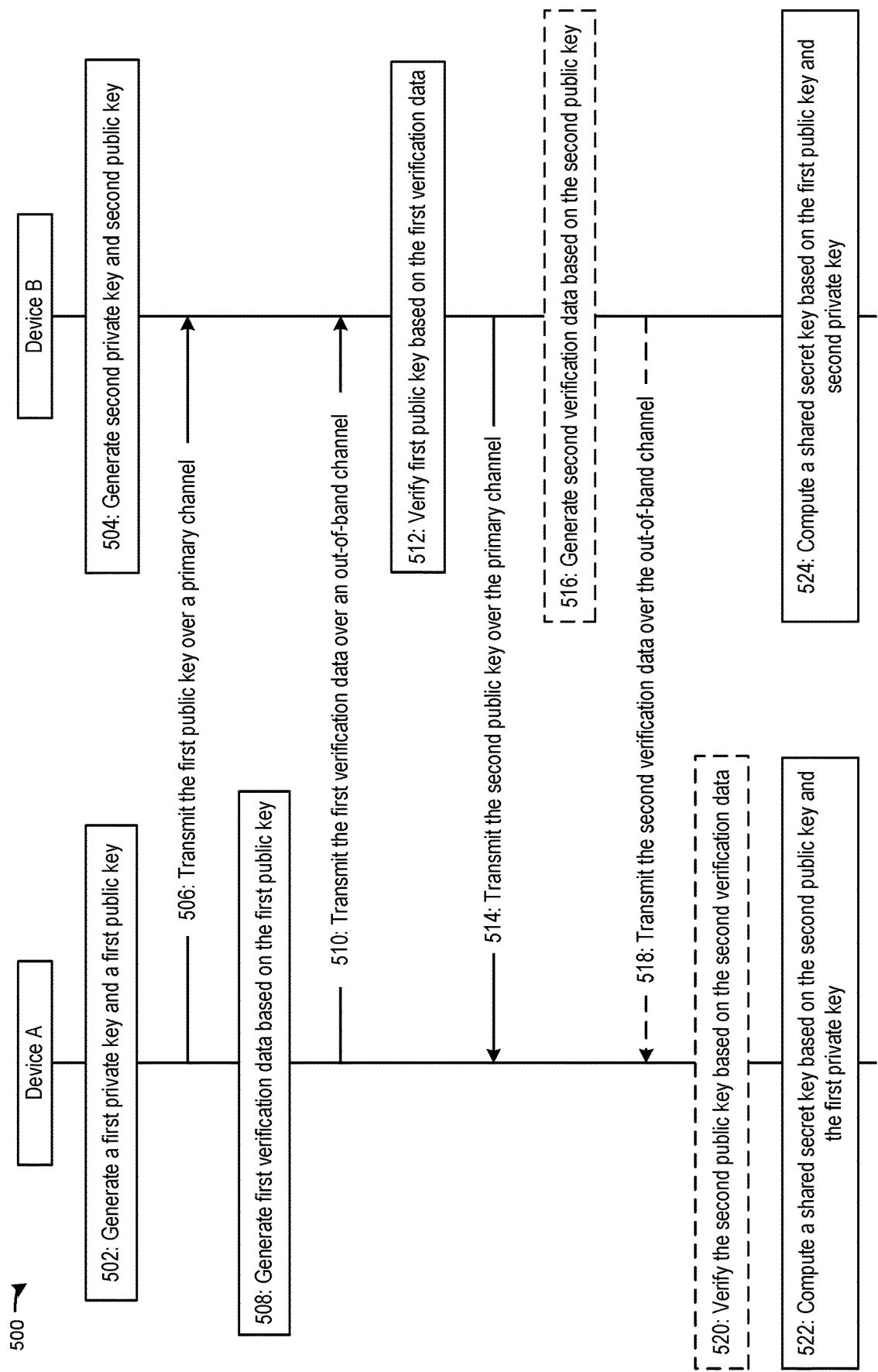
FIG. 5 shows an example pairing process, according to certain embodiments of the present disclosure.

To improve security, the data transferred between host computing device 404 and peripheral device 414 can be encrypted using a set of keys established by the two devices. A pairing process can be performed between peripheral device 414 and host computing device 404 to establish the keys. FIG. 5 illustrates part of an example pairing process 500, which can be part of the Bluetooth® protocol or other wireless protocols. To starting the pairing process, a device A (e.g., host computing device 404) can perform step 502 to generate a first private key and a first public key, whereas a device B (e.g., peripheral device 414) can perform step 504 to generate a second private key and a second public key. In the Bluetooth® protocol, the generation of the private key and public key can be generated based on an elliptic curve Diffie-Hellman (ECDH) protocol using a P-256 elliptic curve. It is understood that other protocols can be used to generate the public key and the private key.

In step 506, device A can transmit the first public key to device B over a primary channel, which can be radio communication channel 436.

In step 508, device A can generate first verification data based on the first public key, which device B can use to device A is both the sender of the first public key and the one or more verification data parameters, to authenticate device A. The first verification data may include, for example, a code and a reference. The code can be a random number generated at device A, whereas the reference can be generated by combining the code with the first public key. Various algorithms can be used to combine the code with the first public key. For example, in the Bluetooth® protocol, the reference can be a commitment value of device A computed using the Faugère f4 function, as follows:

$$Ca = f4(PKa, PKa, ra, 0) \quad \text{(Equation 1)}$$

In Equation 1, Ca is the commitment value of device A, f4 is the Faugère f4 function, PKa is the first public key of device A, whereas ra is a random number generated at device A.

In step 510, device A can transmit the first verification data to device B over a first out-of-band channel. As to be described below, the out-of-band channel can be an optical channel between device A and device B, or any other communication channel other than the primary channel. The out-of-band channel can be configured to be difficult or even impractical for a third party device to intercept and transmit data over the out-of-band channel.

In step 512, device B can verify the first public key based on the first verification data to authenticate device A. For example, device B can extract the random number ra and the commitment value Ca from the first verification data, compute an output based on the extracted random number ra, the first public key received in step 506, and Equation 1 above, and compare the output with the extracted commitment value Ca. If the output matches the extracted commitment value Ca, device B can determine that the first public key and the first verification data are transmitted from the same device A that also has access to the out-of-band channel, and can authenticate device A as a result.

In step 514, device B can transmit the second public key (of device B) to device A over the primary channel. Step 514 can be performed concurrently with, before, or after device A transmits the first public key (of device A) in step 506.

Optionally, device B may perform steps 516 and 518 to allow mutual authentication between device A and device B. Specifically, in step 516, device B can generate second verification data based on the second public key, and in step 518, device B can transmit the second verification data over the out-of-band channel to device A. The second verification data may also include a code and a reference. The code can be a random number rb generated at device B, whereas the reference can be generated by combining the code with the second public key. In the Bluetooth® protocol, the reference can be a commitment value Cb of device B computed using the Faugère f4 function Device A can perform optional step 520 of verifying the second public key (received in step 514) based on the second verification data. The verification may include, for example, computing an output based on the random number rb, the second public key, and the f4 function, and comparing the output with the commitment value Cb of device B extracted from the second verification data.

After verifying the first public key in step 512, device B can compute a shared secret key based on the first public key (of device A) and the second private key (of device B), in step 524. Moreover, device A can also compute the same shared secret key based on the second public key (of device B) and the first private key (of device A). Various algorithms can be used to compute the shared secret key. For example, in the Bluetooth® protocol, device A can compute a Diffie-Hellman key (DHKey) based on the P-256 elliptic curve, as follows:

$$DHkey = P256(SKa, PKb) \quad \text{(Equation 2)}$$

In equation 2, SKa is the first private key of device A, whereas PKb is the second public key of device B. Moreover, device B can compute the same DHKey based on the P-256 elliptic curve, as follows:

$$DHkey = P256(SKb, PKa) \quad \text{(Equation 3)}$$

In equation 3, SKb is the second private key of device B, whereas PKa is the first public key of device A.

Following steps 522 and 524, device A and device B can use the shared secret key to exchange additional data. In some examples, device A and device B can exchange additional security data over the primary channel, and combine the security data with the shared secret key to perform additional authentication operations before the pairing process completes. In some examples, the pairing process can also complete upon verification of the public key (e.g., at device A, at device B, or both). Upon completion of the pairing process, devices A and B can use the shared secret key to encrypt subsequent data exchanged between the devices to provide secure communication between the devices.

Embodiments of Communication Systems Incorporating the Disclosed Techniques

Figure 6:
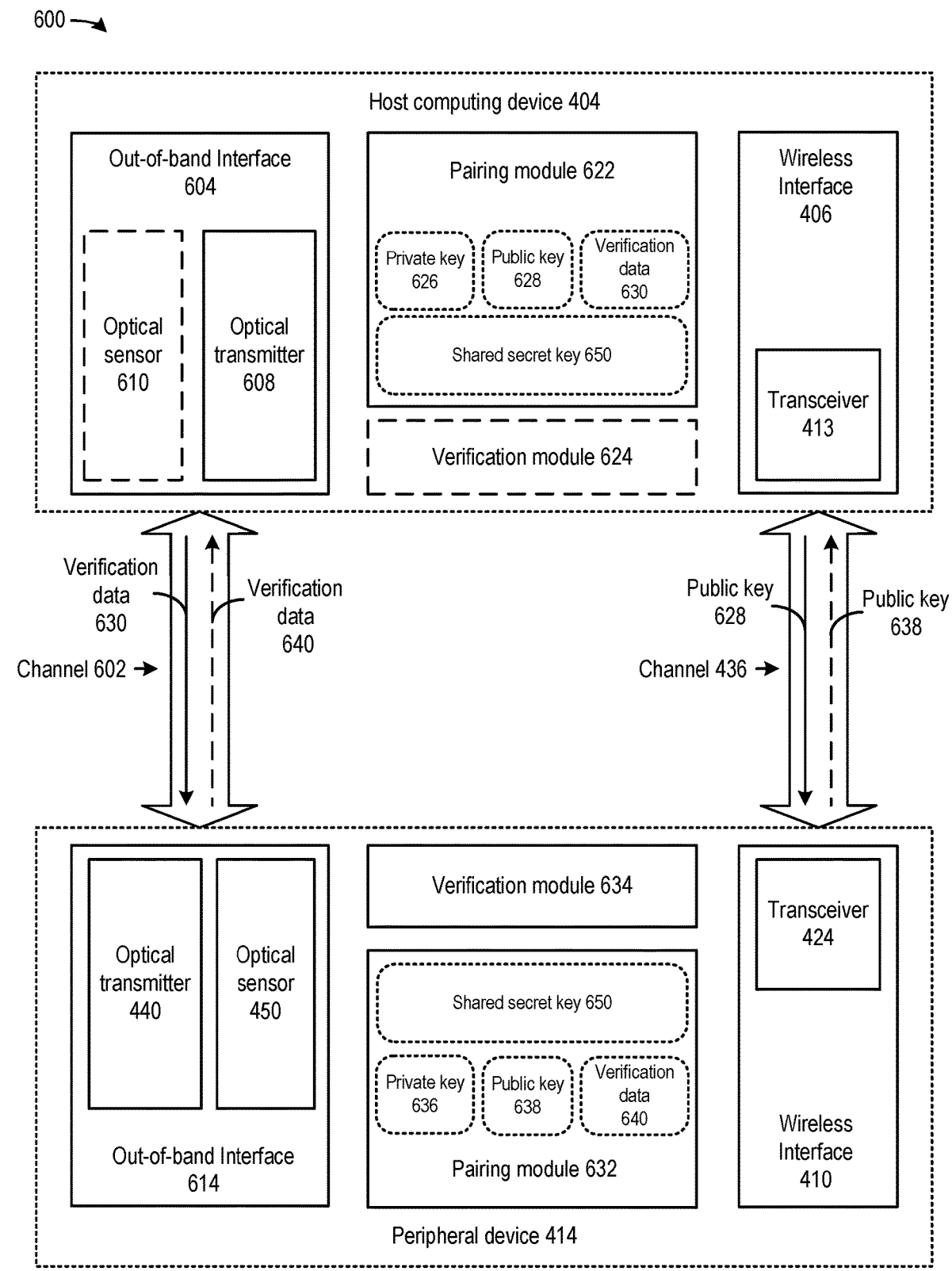
FIG. 6 shows an example communication system to support out-of-band communication in a pairing process, according to certain embodiments of the present disclosure.

FIG. 6 illustrates an example of a communication system 600 which can implement the pairing process of FIG. 5. As shown in FIG. 6, communication system 600 can include host computing device 404 and peripheral device 414 of FIG. 4. Compared with FIG. 4, each of host computing device 404 and peripheral device 414 includes an out-of-band interface to support an out-of-band channel 602 between the devices. For example, host computing device 404 includes an out-of-band interface 604 which includes a light transmitter 608 and an optional optical sensor 610. Light transmitter 608 may include, for example, a display device, a single LED/laser diode, an array of LED/laser diodes, etc. Optical sensor 610 can include, for example, a photodiode, a pixel cell, or a pixel cell array (e.g., of a camera). Moreover, peripheral device 414 includes an out-of-band interface 614. In some examples, as shown in FIG. 6, out-of-band interface 614 may include the optical transmitter 440 and optical sensor 450 used for imaging a surface for speed/movement determination of peripheral device 414. In some examples, out-of-band interface 614 may also include other optical transmitter and/or optical sensor to establish out-of-band channel 602.

Moreover, each of host computing device 404 and peripheral device 414 can execute software instructions and store data to support the pairing process. For example, host computing device 404 includes a pairing module 622 and an optional verification module 624 to support the pairing process of FIG. 5 with peripheral device 414. Specifically, pairing module 622 can generate private key 626 ("first private key") and public key 628 ("first public key"), as well as verification data 630 (first verification data) based on public key 628. Pairing module 622 can also control transceiver 413 to transmit public key 628 over primary channel 436 to peripheral device 414 to initiate the pairing process, and receive public key 638 ("second public key") from peripheral device 414 over primary channel 436. Pairing module 622 can also control optical transmitter 608 to transmit verification data 630 as optical signals to peripheral device 414 over optical out-of-band channel 602. Optionally, verification module 624 can receive verification data 640 ("second verification data") as optical signals from peripheral device 414 over optical out-of-band channel 602 and verify public key 638 based on verification data 640 to authenticate peripheral device 414. Based on verification module 624 authenticating peripheral device 414, pairing module 622 can generate shared secret key 650 based on private key 626 of host computing device 404 and public key 638.

In addition, peripheral device 414 also includes a pairing module 632 and a verification module 634 to support the pairing process of FIG. 5 with host computing device 404. Pairing module 632 can generate private key 636 ("second private key") and public key 638, and optionally verification data 640 based on public key 638. Pairing module 632 can receive public key 628 from host computing device 404 over primary channel 436. Pairing module 622 can also configure optical transmitter 440 and optical 450 of out-of-band Interface 614 to communicate with host computing device 404 over out-of-band channel. Specifically, while receiving optical signals including verification data 630 from host computing device 404, pairing module 622 can disable optical transmitter 440 to avoid interference with the incoming optical signals. Pairing module 622 can disable optical transmitter 440 based on receiving public key 628 from host computing device 404 to start the pairing process. As to be described in more details below, pairing module 622 can also configure optical sensor 450 based on characteristics of the optical signals to improve the accuracy of detecting the verification data. In addition, verification module 634 can receive verification data 630 and verify public key 638 based on verification data 630 to authenticate host computing device 404. Based on verification module 634 authenticating host computing device 404, pairing module 632 can generate shared secret key 650 based on private key 636 of peripheral device 414 and public key 628. Optionally, after receiving verification data 630 from host computing device 404 over optical out-of-band channel 602, pairing module 632 can enable optical transmitter 440 to transmit verification data 640 to host computing device 404 over optical out-of-band channel 602 to allow host computing device 404 to authenticate peripheral device 414.

Figure 7A:
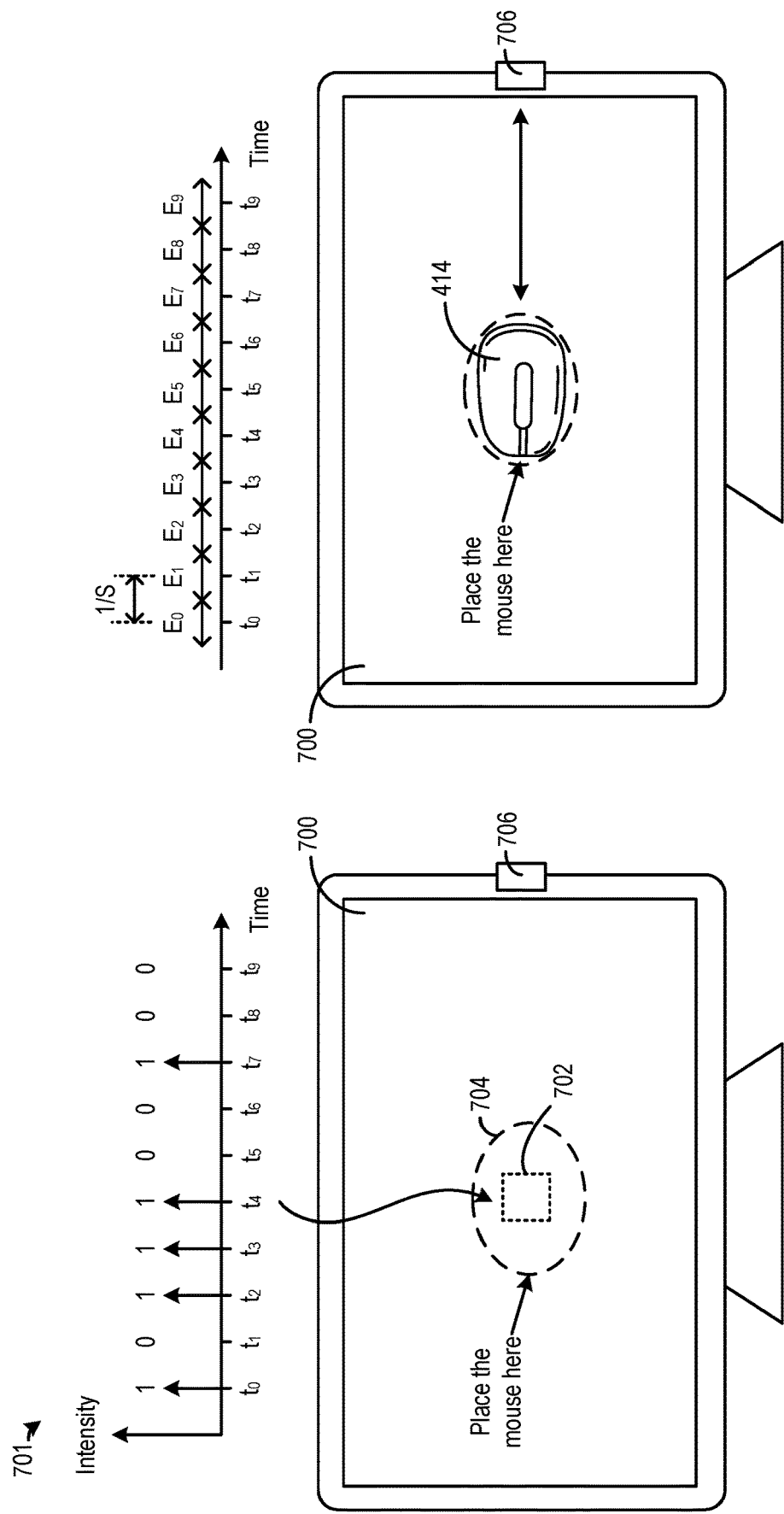
FIG. 7A and FIG. 7B show examples of out-of-band communication, according to certain embodiments of the present disclosure.
Figure 7B:
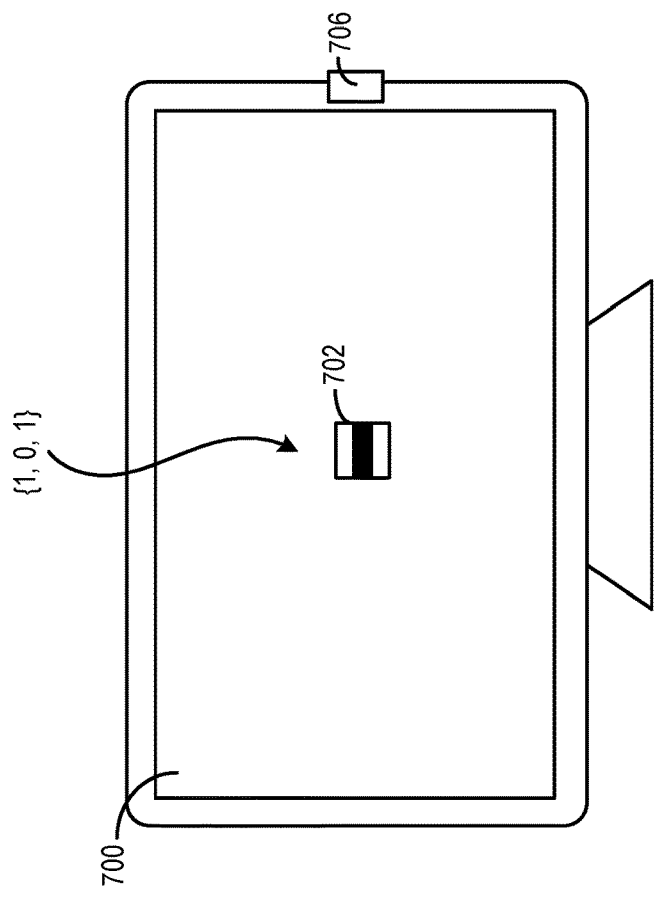
Figure 7B:
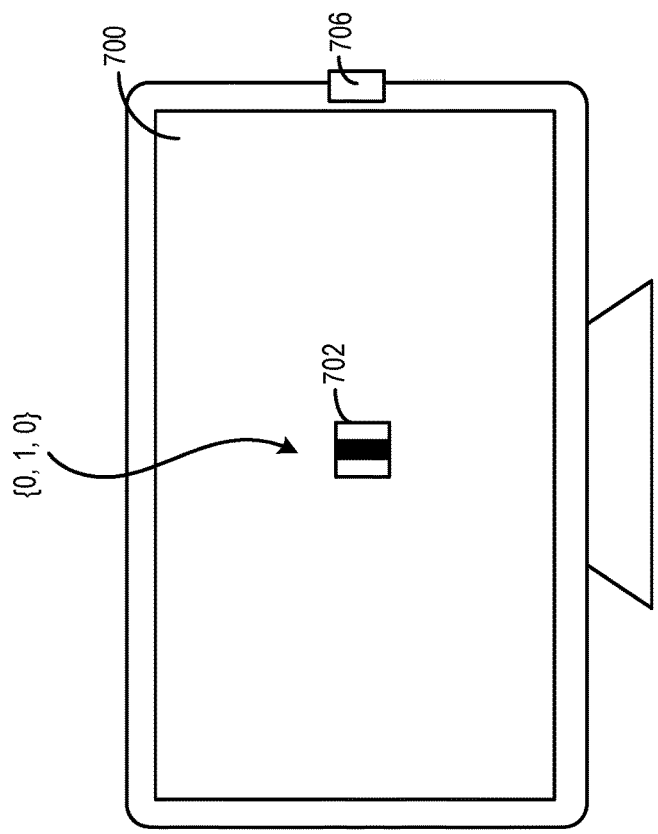

FIG. 7A and FIG. 7B illustrate example methods of transmission of verification data 630 by host computing device 404. As shown in FIG. 7A, host computing device 404 can control a display device 700, which can be part of optical transmitter 608, to output one or more pixels 702. The one or more pixels 702 can be generated based on verification data 630. Various attributes of the one or more pixels 702 can be configured to represent verification data 630, which typically includes a sequence of numbers. The attributes of the one or more pixels 702 can be configured to be detected, with a confidence, by optical sensor 450 of wireless peripheral device 414, which typically has relatively low resolution. For example, one or more pixels 702 can have an uniform pixel value (e.g., same color), while the output intensities of the one or more pixels 702 varies with respect to time. The one or more pixels 702 can be output by display device 700 in a plurality of image frames, with each image frame having the one or more pixels associated with a particular output intensity. For example, image frames including one or more pixels 702 having a time-series pattern of intensities 701. Non-zero output intensity can be output at times $t_0$, $t_2$, $t_3$, $t_4$, and $t_7$, whereas image frames including one or more pixels 702 having zero output intensity can be output at times $t_1$, $t_5$, $t_6$, $t_8$, and $t_9$. The output intensities of the one or more pixels 702 can be encoded in binary form, with zero intensity representing a logical zero and non-zero intensity representing a logical one.

Peripheral device 414 can be positioned on display device 700 to establish the optical out-of-band channel 602 with display device 700 and to receive the one or more pixels 702. Optical sensor 450 can detect a time-series pattern of binary intensities of the one or more pixels 702. Based on the time-series pattern, pairing module 632 of peripheral device 414 can extract verification data 630 and provide verification data 630 to verification module 634. Meanwhile, computing device 404 also transmits public key 628 to peripheral device 414 over the primary wireless channel 436. Verification module 634 can then verify public key 628 based on verification data 630 to authenticate host computing device 404. After verification completes (and/or the pairing process completes), peripheral device 414 can output an indication to indicate that verification completes, and the user can remove peripheral device 414 from display device 700. The indication can include, for example, a sequence of light pulses which can be output by optical transmitter 440 or by other optical transmitter of peripheral device 414. The indication can also include audio signals output by peripheral device 414. Peripheral device 414 can also output an indication that the verification fails and the pairing process stops.

Display device 700, as well as one or more pixels 702, can be configured to improve the security of the optical out-of-band channel 602 to prevent interception of verification data 630 by a third party device. For example, one or more pixels 702 can be included in a pixel region having dimensions smaller than the footprint of peripheral device 414, such that one or more pixels 702 are completely covered up by peripheral device 414 when the peripheral device is placed on display device 700. To facilitate alignment between one or more pixels 702 and optical sensor 450, host computing device 404 can control display device 700 to output additional information, such as a contour line 704, to allow the user to place peripheral device 414 at a proper location on display device 700 to align optical sensor 450 with one or more pixels 702. In addition, display device 700 may also include a sensor 706 to detect that peripheral device 414 is within a threshold distance from display device 700. Sensor 706 can include, for example, a proximity sensor, a touch sensor, another optical sensor, etc. Host computing device 404 can control display device 700 to output one or more pixels 702 only when sensor data from sensor 706 indicates that peripheral device 414 is within the threshold distance from display device 700 (or based on an input from a trusted party, such as the user). In addition, the output intensities of display device 700 can also be reduced to prevent another device from receiving the optical signals of the verification data from afar. All these features can reduce the likelihood of a MITM attacker from eavesdropping on the optical signals containing the verification data.

In addition, pairing module 632 can also configure optical sensor 450 of peripheral device 414 to facilitate detection of one or more pixels 702. For example, upon entering the pairing mode (e.g., after receiving public key 628 from host computing device 404), pairing module 632 can adjust the exposure periods (e.g., E0, E1, etc.) of optical sensor 450 based on the output intensities of display device 700, and synchronize the exposure periods with the timing of the image frames of one or more pixels 702. The exposure periods in the pairing mode can be longer and repeated at a lower frequency compared with, for example, when optical sensor 450 is used to detect reflected light from the surface. The exposure period can be extended to allow optical sensor 450 to detect optical signals of one or more pixels 702, which can have relatively low intensities to avoid detection by a third party device as described above. Moreover, the sampling rate of optical sensor (denoted by S in FIG. 7A), as well as the image frame rate, can be at a relatively low frequency. The sampling rate of optical sensor 450 is typically higher when detecting reflected light from the surface to track the movement of peripheral device 414, but can be reduced to accommodate for the extended exposure period and to facilitate detection of the optical signals by optical sensor 450. After the pairing process completes, pairing module 632 can restore the exposure period and sampling rate of optical sensor 450.

In some examples, one or more pixels 702 can include a two-dimensional pixel pattern to encode more information in an image frame. Such arrangements can reduce the number of image frames needed to represent verification data 630, which can reduce the time required for the verification process and the pairing process as a whole. For example, as shown in FIG. 7B, in a first image frame one or more pixels 702 can include a first pixel pattern which can represent a set of binary codes {0, 1, 0}, whereas in a second image frame one or more pixels 702 include a second pixel pattern which can represent another set of binary codes {1, 0, 1}. Compared with the arrangements of FIG. 7A where each image frame outputs one binary code, the arrangements of FIG. 7B can reduce the total number of image frames needed to represent verification data 630 by one-third. The complexity of the two-dimensional pixel pattern, and the amount of information represented by the pixel pattern, can be limited by the size of the pixel region including one or more pixels 702, as well as the resolution of optical sensor 450.

Figure 8:
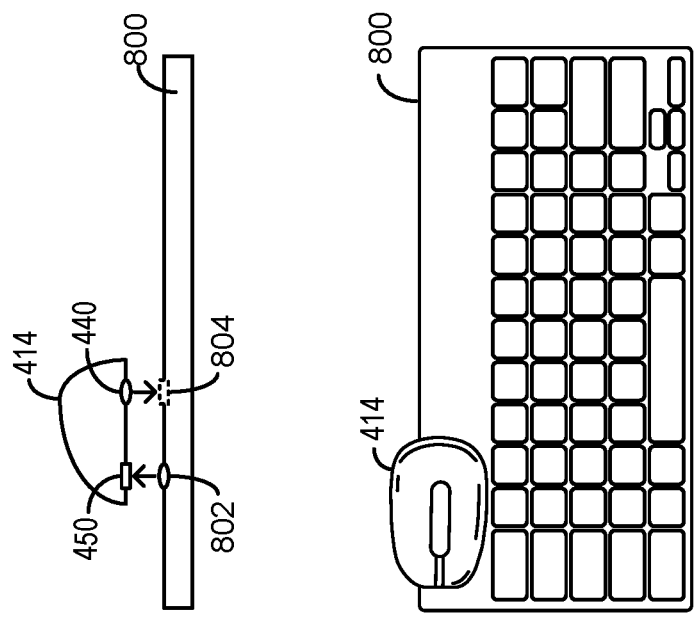
FIG. 8 shows another example of out-of-band communication, according to certain embodiments of the present disclosure.
Figure 8:
Figure 8:
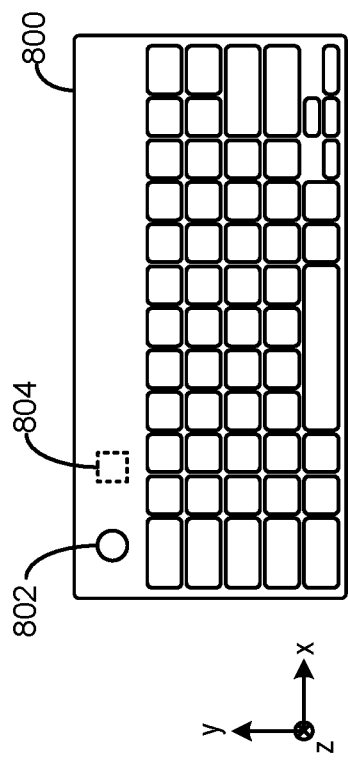
Figure 9:
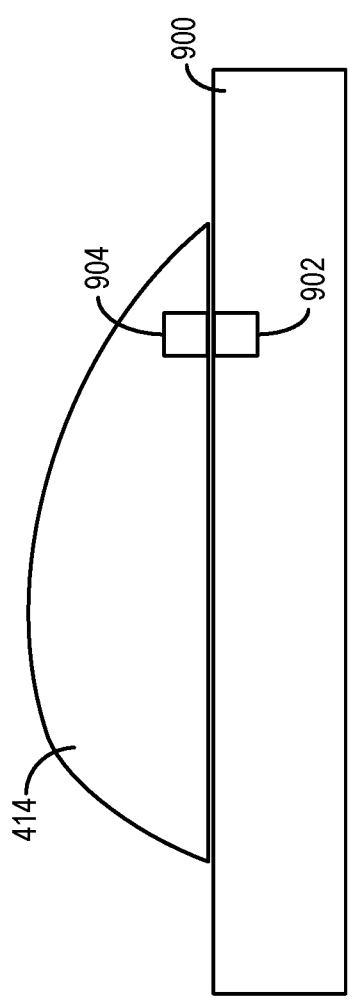
FIG. 9 shows another example of out-of-band communication, according to certain embodiments of the present disclosure.

FIG. 8 and FIG. 9 illustrate additional methods of transmission of verification data 630 by host computing device 404. As shown in FIG. 8, a peripheral device 800 (e.g., a keyboard) coupled with host computing device 404 (not shown in FIG. 8) may include an optical transmitter 802 and an optional optical sensor 804. Optical transmitter 802 can include a single light transmitting device or an array of light transmitting devices, such as a light emitting diode, a laser diode, etc., which can be controlled to output a sequence of light pulses. The sequence of light pulses can be based on time-series intensity pattern 701 of FIG. 7A to convey verification data 630. Peripheral device 414 can be positioned on peripheral device 800 and over optical transmitter 802 to establish optical out-of-band channel 602 to receive verification data 630. As in FIG. 7A and FIG. 7B, peripheral device 800 can also include a sensor to detect that peripheral device 414 is positioned on peripheral device 800 before transmitting the light pulses. In addition, optical sensor 804 can receive also optical signals, such as light pulses, from optical transmitter 440 conveying verification data 640, which can be transmitted to host computing device 404 to perform authentication of peripheral device 414.

In some examples, an out-of-band channel can be formed in other medium, such as through conduction of electrical signals. FIG. 9 illustrates an example where verification data 630 is transmitted via electrical signals. As shown in FIG. 9, a docketing device 900 (e.g., a charging device/pad for peripheral device 414) coupled with host computing device 404 (not shown in FIG. 9) can include a socket 902 for forming an electrical connection with a socket 904 of peripheral device 414. Pairing module 622 of host computing device 404 can transmit verification data 630 to peripheral device 414 via sockets 902 and 904. Pairing module 632 of peripheral device 414 can also transmit verification data 640 to host computing device 404 via sockets 902 and 904. In some examples, host computing device 404 can detect that an electrical connection is established between sockets 902 and 904 (e.g., by transmitting a test current) before transmitting the electrical signals of verification data 640 to socket 902.

Method

Figure 10:
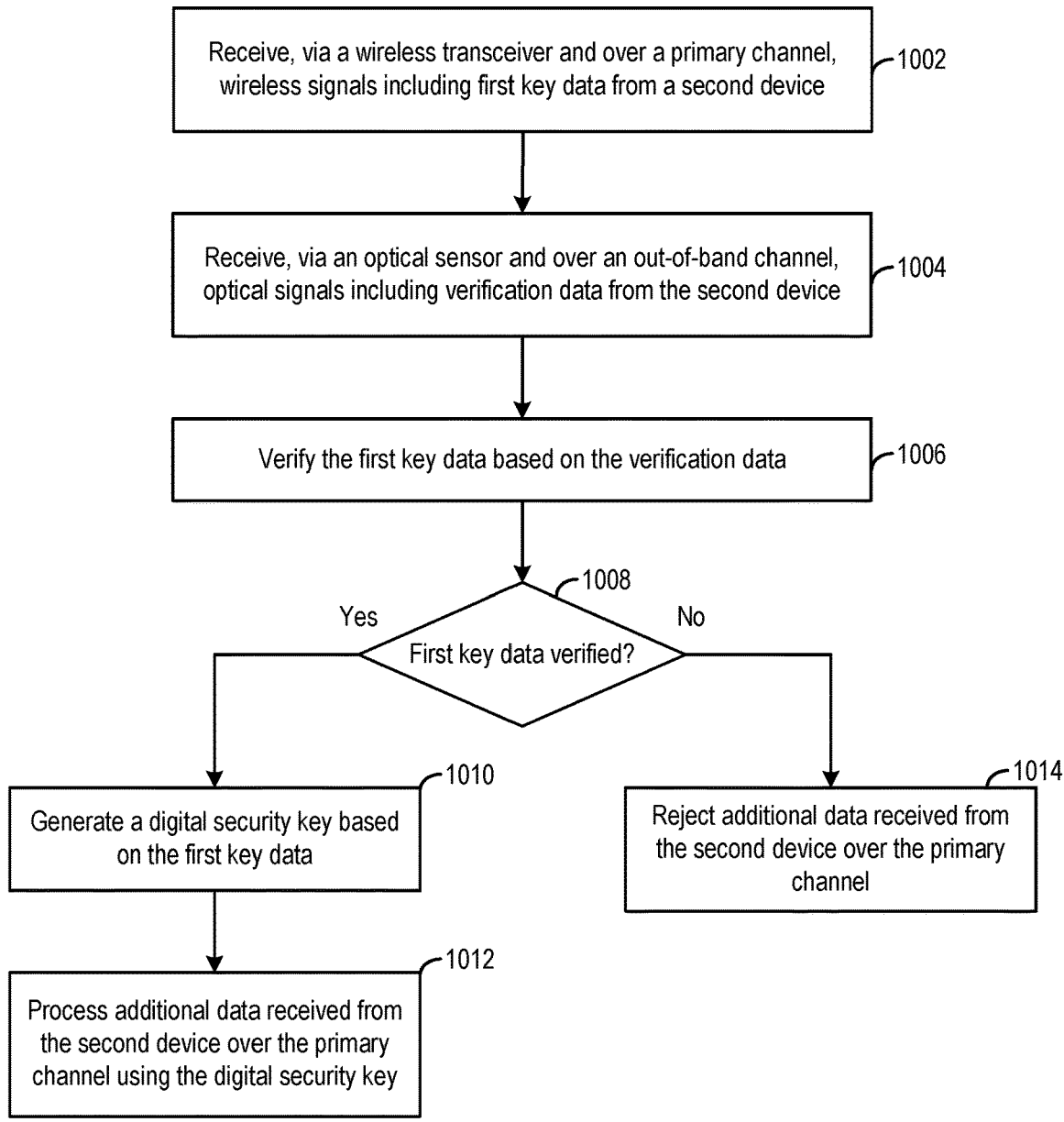
FIG. 10 and FIG. 11 show example flow charts of methods of wireless communication, according to certain embodiments of the present disclosure.

FIG. 10 illustrates a flowchart of an example method 1000 for performing wireless communication. Method 1000 can be performed by a wireless peripheral device, such as peripheral device 414 of FIG. 4.

Method 1000 begins with step 1002, in which the wireless peripheral device receives, via a wireless transceiver and over a primary channel, wireless signals including first key data from a second device. The second device can be host computing device 404 of FIG. 4. The wireless signals can be transmitted as part of a pairing process between the wireless peripheral device and the host computing device. The first key data can include a public key of the second device.

In step 1004, the wireless peripheral device receives, via an optical sensor and over an out-of-band channel, optical signals including verification data from the second device. The verification data may include, for example, a code and a reference. The code can be a random number generated at the second device, whereas the reference can be generated by combining the code with the public key of the second device. Various algorithms can be used to combine the code with the public key. For example, in the Bluetooth® protocol, the reference can be a commitment value of the second device computed by applying the Faugère f4 function on the public key and the random number, as described above in Equation 1 The optical signals can include, for example, pixel data output by a display of the second device as described in FIG. 7A and FIG. 7B, light pulses output by an optical transmitter, etc. The wireless peripheral device may configure the optical sensor to facilitate detection of the optical signals such as, for example, adjusting the exposure period, the sampling rate, etc.

In step 1006, the wireless peripheral device verifies the first key data. The verification can be based on, for example, Equation 1. For example, the wireless peripheral device can extract the random number and the commitment value from the verification data, compute an output based on the extracted random number, the public key (the first key data) received in step 1002, and Equation 1 above, and compare the output with the extracted commitment value. If the output matches the extracted commitment value, the wireless peripheral device can determine that the public key and the verification data are transmitted from the same second device that also has access to the out-of-band channel, and can authenticate the second device as a result.

If the wireless device determines that the first key data is verified, in step 1008, the wireless peripheral device can generate a digital security key based on the first key data, in step 1010. The digital security key can be a shared secret key with the second device and can be a Diffie-Hellman key (DHKey) based on the P-256 elliptic curve, as described above with respect to Equation 2. The wireless peripheral device can process additional data received from the second device over the primary channel using the digital security key, in step 1012. In some examples, the wireless peripheral device and the second device can exchange additional security data over the primary channel, and combine the security data with the shared secret key to perform additional authentication operations before the pairing process completes. In some examples, the pairing process can also complete upon verification of the public key. Upon completion of the pairing process, the wireless peripheral device and the second device can use the shared secret key to encrypt subsequent data exchanged between the devices to provide secure communication between the devices.

On the other hand, if the first key data is not verified (in step 1008) due to, for example, the output computed from the extracted random number not matching the commitment value, the wireless peripheral device can reject additional data received from the second device over the primary channel, to mitigate security risk.

Figure 11:
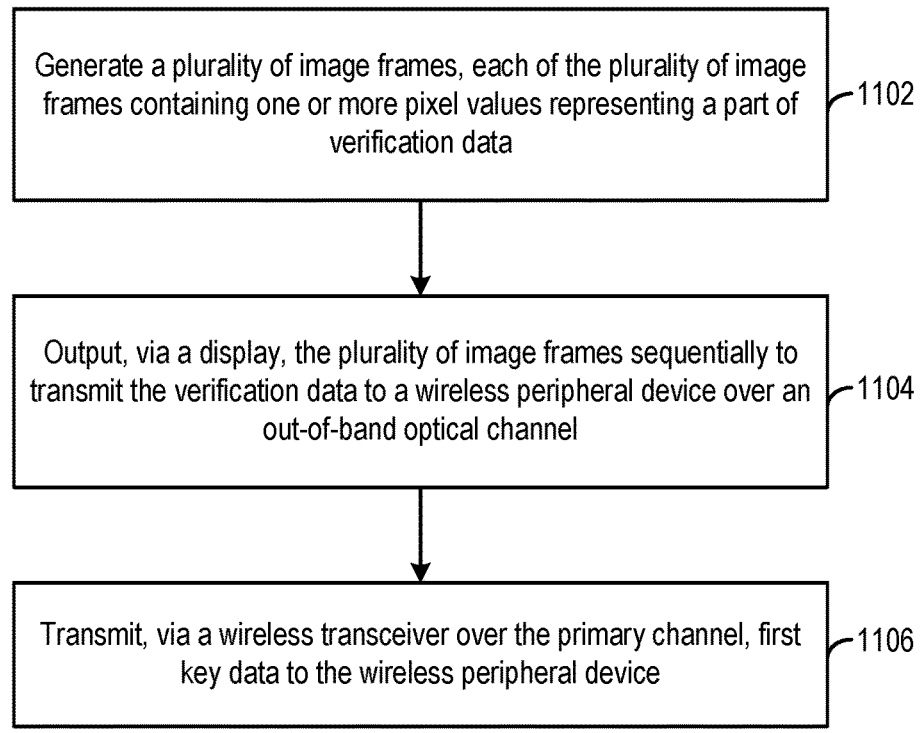

FIG. 11 illustrates a flowchart of an example method 1100 for performing wireless communication. Method 1100 can be performed by a host computing device, such as host computing device 404 of FIG. 4.

In step 1102, the host computing device generates a plurality of image frames to be output to a wireless peripheral device. Each of the plurality of image frames contains one or more pixel values representing a part of verification data. The verification data may include, for example, a code and a reference. The code can be a random number generated at the host computing device, whereas the reference can be generated by combining the code with a public key of the host computing device. Examples of the pixels are described with respect to FIG. 7A and FIG. 7B. The pixel values can be included in a pixel region that is detectable by the optical sensor. The size of the pixel region can be configured to be covered by the wireless peripheral device when the wireless peripheral device is placed on a display of the host computing device. The pixel region may include a single color or a pattern as shown in FIG. 7B.

In step 1104, the host computing device can output, via the display, the plurality of image frames sequentially to transmit the verification data to the wireless peripheral device over an out-of-band optical channel. The intensity of the optical signals from the display can be configured to be detectable by the wireless peripheral device when the wireless peripheral device is within a pre-determined distance from the display.

In step 1106, the host computing device can transmit, via a wireless transceiver over a primary channel, first key data to the wireless peripheral device. The first key data can be a public key of the host computing device. The transmission of the verification data and the first key data to the wireless peripheral device enable the wireless peripheral device to verify the first key data based on the verification data; and responsive to verifying the first key data based on the verification data, generate a digital security key based on the first key data. As described above, the verification can be based on, for example, Equation 1. For example, the wireless peripheral device can extract the random number and the commitment value from the verification data, compute an output based on the extracted random number, the public key, and Equation 1 above, and compare the output with the extracted commitment value. If the output matches the extracted commitment value, the wireless peripheral device can determine that the public key and the verification data are transmitted from the same second device that also has access to the out-of-band channel, and can authenticate the host computing device as a result.

The wireless peripheral device can generate a digital security key based on the first key data after verifying the first key data. The digital security key can be a shared secret key with the host computing device and can be a Diffie- Hellman key (DHKey) based on the P-256 elliptic curve, as described above with respect to Equation 2. The host computing device can also generate the same shared secret key. Both devices can use the shared secret key to perform subsequent wireless communication (e.g., to complete the pairing process, to encrypt and decrypt exchanged data, etc.).

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For instance, any of the embodiments, alternative embodiments, etc., and the concepts thereof may be applied to any other embodiments described and/or within the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. An apparatus, comprising:
  a display;
  a wireless transceiver configured to receive and transmit data over a primary channel;
  one or more non-transitory computer readable storage mediums that stores a set of instructions; and
  one or more processors that, upon execution of the set of instructions, is configured to:
    generate a plurality of image frames, each of the plurality of image frames containing one or more pixels representing a different part of verification data;
    output, via the display, the plurality of image frames sequentially to transmit the verification data to a wireless peripheral device over an out-of-band channel; and
    transmit, via the wireless transceiver over the primary channel, first key data to the wireless peripheral device,
    wherein the transmission of the verification data and the first key data to the wireless peripheral device enable the wireless peripheral device to:
      verify the first key data based on the verification data; and
      responsive to verifying the first key data based on the verification data,
      generate a digital security key based on the first key data,
    wherein the one or more processors is configured to generate the each image frame to set a pre-determined pixel region of the each image frame to have the one or more pixels, and
    wherein the one or more processors is configured to set a size of the pixel region to be smaller than a footprint of the wireless peripheral device.

2. The apparatus of claim 1, wherein the size of the pixel region is configured such that the wireless peripheral device is capable of receiving the verification data when an optical sensor of the wireless peripheral device aligns with the pixel region; and
  wherein the wireless peripheral device completely covers the pixel region when the optical sensor of the wireless peripheral device is positioned within a pre-determined distance over the display.

3. The apparatus of claim 1, wherein the one or more processors is configured to:
  receive an indication to initiate transmission of the verification data; and
  output the plurality of image frames via the display in response to receiving the indication.

4. The apparatus of claim 1, wherein the one or more processors is configured to control the display to output a prompt for bringing the wireless peripheral device onto the display prior to outputting the plurality of image frames.

5. The apparatus of claim 1, wherein the one or more processors is configured to:
  generate the digital security key;
  encrypt second data based on the digital security key; and
  transmit the encrypted second data over the primary channel to the wireless peripheral device.

6. A method, comprising:
  generating, by a host computer, a plurality of image frames, each of the plurality of image frames containing one or more pixels representing a different part of verification data;
  outputting, via a display of the host computer, the plurality of image frames sequentially to transmit the verification data to a wireless peripheral device over an out-of-band channel; and
  transmitting, via a wireless transceiver of the host computer over a primary channel, first key data to the wireless peripheral device,
  wherein transmitting the verification data and the first key data to the wireless peripheral device enable the wireless peripheral device to verify the first key data based on the verification data; and
  responsive to verifying the first key data based on the verification data, generating a digital security key based on the first key data, wherein the host computer is configured to generate the each image frame to set a pre-determined pixel region of the each image frame to have the one or more pixels, and wherein the host computer is configured to set a size of the pixel region to be smaller than a footprint of the wireless peripheral device.

\* \* \* \* \*